United States Patent [19]

Tsujimura

[11] Patent Number: 4,751,588
[45] Date of Patent: Jun. 14, 1988

[54] VIDEO DISC REPRODUCING APPARATUS

[75] Inventor: Katsuhito Tsujimura, Kanagawa, Japan

[73] Assignee: Sony Corporation, Tokyo, Japan

[21] Appl. No.: 942,708

[22] Filed: Dec. 17, 1986

[30] Foreign Application Priority Data

Dec. 20, 1985 [JP] Japan .................................. 60-287272

[51] Int. Cl.$^4$ ............................................. H04N 5/85
[52] U.S. Cl. .................................................. 358/342
[58] Field of Search ............... 358/312, 313, 335, 342; 360/10.1

[56] References Cited

U.S. PATENT DOCUMENTS 4,361,849 11/1982 Bolger .......................... 360/10.1 X
4,430,675 2/1984 Fujime ................................. 358/342
4,477,843 10/1984 Kinjo et al. .......................... 358/342
4,554,597 11/1985 Sugiyama et al. .................. 358/335

Primary Examiner—W. B. Perkey
Attorney, Agent, or Firm—Lewis H. Eslinger

[57] ABSTRACT

An apparatus for reproducing a video signal from a video disc performs varied-speed reproduction with track jumps such that the reproduced video signal of a relatively stable field period occurring immediately after a track jump is written into a memory in synchronism with a reproduced vertical synchronizing signal and is read out from the memory in synchronism with a reference vertical synchronizing signal so as to avoid disruption of the resultant image caused by the track jumps.

6 Claims, 4 Drawing Sheets

VIDEO DISC REPRODUCING APPARATUS

BACKGROUND OF THE INVENTION

1. Field of the Invention

The present invention relates to a video disc reproducing apparatus and, more particularly, to an apparatus which is capable of performing varied-speed reproduction of a CLV (constant linear velocity) or long-time type video disc where synchronizing signals recorded in adjacent tracks are positionally non-coincident with each other.

2. Description of the Prior Art

Optical video discs for general home use are classified into a standard or CAV (constant angular velocity) disc where a video signal of one frame (two fields) is recorded in each circular track on the disc, and a long-time or CLV (constant linear velocity) disc where the linear velocity for each track is maintained constant and the number of frames recorded in one circular track changes within a range of one to three during progress of reproduction from the innermost track to the outermost track.

FIGS. 4 and 5 schematically illustrate a CAV disc 41 and a CLV disc 42, respectively. In the CAV disc 41, as is obvious from the drawing, positions 44 of recorded vertical synchronizing signals (V signals) in adjacent tracks 43 are coincident with each other, so that there occurs no disorder in the synchronism of reproduced video signal despite a track jump of an optical pickup head, whereby any varied-speed reproduction mode with track jumps such as slow, still, fast-forward or reverse reproduction can be achieved substantially without causing any disorder of the reproduced picture. Meanwhile in the CLV disc 42, positions 44 of recorded vertical synchronizing signals (V signals) in adjacent tracks 43 are not coincident with each other, so that the synchronism of the reproduced video signal is disordered due to a track jump of an optical pickup head, thereby causing considerable disorder of the reproduced picture to eventually bring about difficulties in practical use.

OBJECT AND SUMMARY OF THE INVENTION

The present invention has been accomplished in view of the circumstances mentioned above, and its object resides in providing an improved video disc reproducing apparatus which is capable of effectively preventing such picture disorder in any varied-speed reproduction mode executed with track jumps on a CLV disc.

According to one aspect of the present invention, there is provided an apparatus for reproducing a video signal from a disc-shaped recording medium having recording tracks on which a video signal is so recorded that the length in the track direction for a video signal of one field duration is constant regardless of the radius of the recording track. The apparatus comprises a head for reproducing the video signal; a means for generating a track jump signal supplied to the reproducing head; a memory means having a capacity of storing at least the video signal of one field duration; a circuit for separating a vertical synchronizing signal from the reproduced video signal; a signal generator for generating a reference vertical synchronizing signal; and a memory control means supplied with the track jump signal, the reproduced vertical synchronizing signal and the reference vertical synchronizing signal, and serving to control the memory means in such a manner that the reproduced video signal of one field duration succeeding the track jump signal is written in the memory means in synchronism with the reproduced vertical synchronizing signal and the signal stored in the memory means is read out therefrom in synchronism with the reference vertical synchronizing signal.

DETAILED DESCRIPTION OF THE PREFERRED EMBODIMENTS

In the video disc reproducing apparatus of the present invention that performs its operation with track jumps of a pickup head for reproducing a video disc where recorded synchronizing signals in adjacent video tracks are positionally non-coincident with each other, an important feature resides in comprising a field memory for storing the reproduced video signal of at least one field duration obtained from the pickup head, and a means for writing, in response to a track jump driving signal, a stable portion of the post-jump reproduced video signal in the field memory in synchronism with the reproduced vertical synchronizing signal, and reading out the written video signal in synchronism with a reference vertical synchronizing signal which is unrelated to the track jump.

The video signal read out from the field memory is synchronized with a reference synchronizing signal outputted continuously without any relation to the track jump, so that there occurs no disorder in the synchronism of the output video signal to consequently attain effective prevention of any disorder in the reproduced picture.

Figure 1:
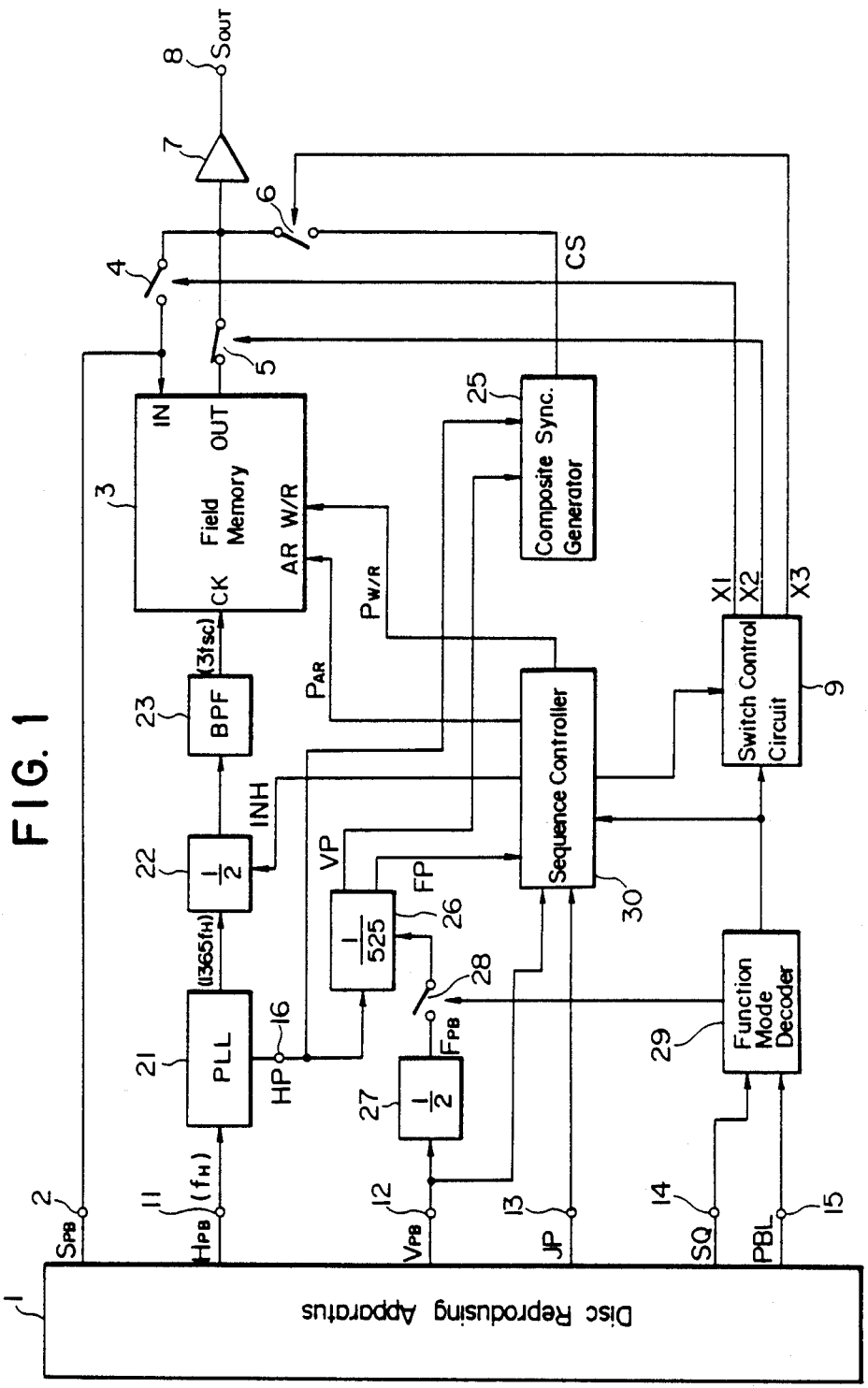
FIG. 1 is a block circuit diagram schematically showing the constitution of an exemplary embodiment of the present invention.

FIG. 1 is a block diagram for explaining an exemplary embodiment of the present invention.

In FIG. 1, a disc reproducing apparatus 1 comprises a mechanism for reproduction of an optical video disc, a system controller and a partial configuration of a reproducing circuit, wherein a reproduced video signal $S_{PB}$ is obtained from an output terminal 2. The reproduced video signal $S_{PB}$ is fed to an input terminal of a field memory 3 and also to a first selector switch 4. The video output signal from the field memory 3 is sent to a second selector switch 5. The respective output terminals of the first selector switch 4, a second selector switch 5 and a third selector switch 6 are connected in common to an output terminal 8 via an amplifier 7 in such a manner that the three switches 4, 5 and 6 are selectively turned on in accordance with switch control signals X1, X2 and X3 outputted from an analog switch control circuit 9 which will be described later.

The disc reproducing apparatus 1 transmits a horizontal synchronizing pulse (H pulse) of the reproduced video signal $S_{PB}$ via a terminal 11 and also a vertical synchronizing pulse (V pulse) $V_{PB}$ thereof via a terminal 12, respectively, and further transmits other control signals such as a jump pulse JP, a normal/still switch signal SQ and a reproduction lamp signal PBL via terminals 13, 14 and 15 respectively.

The reproduced H pulse $H_{PB}$ of a frequency fH obtained from the terminal 11 is fed to a PLL circuit 21 for synchronization and then is converted into a high-frequency pulse signal of 1365 fH, which is further processed through a ½ frequency divider 22 and a BPF (band pass filter) 23 to become a clock pulse signal having a frequency of 3 fsc. (In the NTSC standards, the color subcarrier frequency fsc=455/2 fH) Such clock pulse signal is then fed to a clock input terminal of the field memory 3. The PLL circuit 21 transmits through its terminal 16 a reference H pulse signal HP obtained by frequency-dividing the aforesaid pulse signal of 1365 fH at a rate of 1/1365. The reference H pulse HP is then fed to a composite synchronizing signal generator 25 and a 1/525 frequency divider 26, from which a reference frame pulse FP and a reference V pulse VP are outputted. The reference frame pulse FP is fed to a sequence controller 30, while the reference V pulse VP is fed to the composite synchronizing signal generator 25. The reproduced V pulse $V_{PB}$ from the terminal 12 is fed to both a ½ frequency divider 27 and the sequence controller 30, and the reproduced frame pulse $F_{PB}$ outputted from the ½ frequency divider 27 is fed via a switch 28 to, e.g. a clear terminal of the 1/525 frequency divider 26.

In the next stage, the jump pulse JP from the terminal 13 is fed to the sequence controller 30, while the normal/still switch signal SQ from the terminal 14 and the reproduction lamp signal PBL from the terminal 15 are both fed to a function mode decoder 29.

The jump pulse JP serves as a jump driving signal for enabling the optical pickup head of the disc reproducing apparatus 1 to perform a track jump; the normal/still switch signal SQ serves to select under control either a still motion mode or one of several reproduction modes including standard-speed reproduction and varied-speed reproduction except the still motion mode; and the reproductron lamp signal PBL serves to light up a lamp which indicates a normal standard reproduction mode. The function mode decoder 29 selectively determines one function mode in accordance with such normal/still switch signal SQ and reproduction lamp signal PBL and produces a signal which represents, e.g. a varied-speed reproduction mode (such as fast-forward or reverse mode) other than the still motion mode. The output signal from the function mode decoder 29 is fed to both the analog switch control circuit 9 and the sequence controller 30 while being fed also as a switch control signal to the switch 28.

The sequence controller 30 transmits a clock stop signal INH to the ½ frequency divider 22 for temporarily stopping the clock signal input to the field memory 3, and also transmits an address reset pulse $P_{AR}$ and a write/read switch signal $P_{W/R}$ to an address reset terminal AR and a write/read control terminal W/R of the field memory 3 respectively. The analog switch control circuit 9 produces, in response to the output signal of the function mode decoder 29 and that of the sequence controller 30, switch control signals X1, X2 and X3 for selectively controlling the aforesaid switches 4, 5 and 6 respectively. The composite synchronizing signal CS obtained from the signal generator 25 is fed to the third switch 6.

Figure 2:
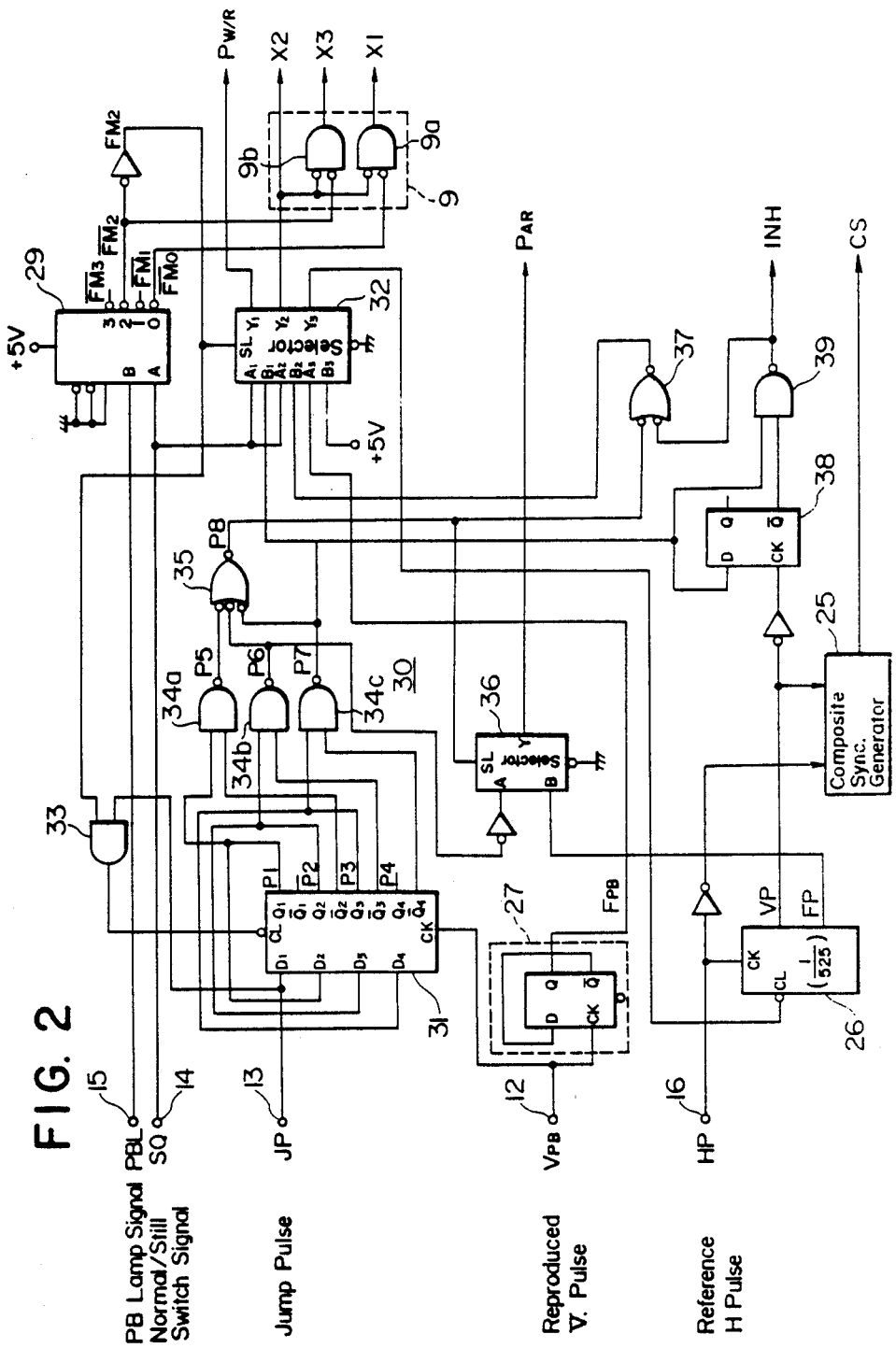
FIG. 2 is a circuit diagram showing detailed configurations of a sequence controller and its peripheral circuits in FIG. 1.
Figure 3:
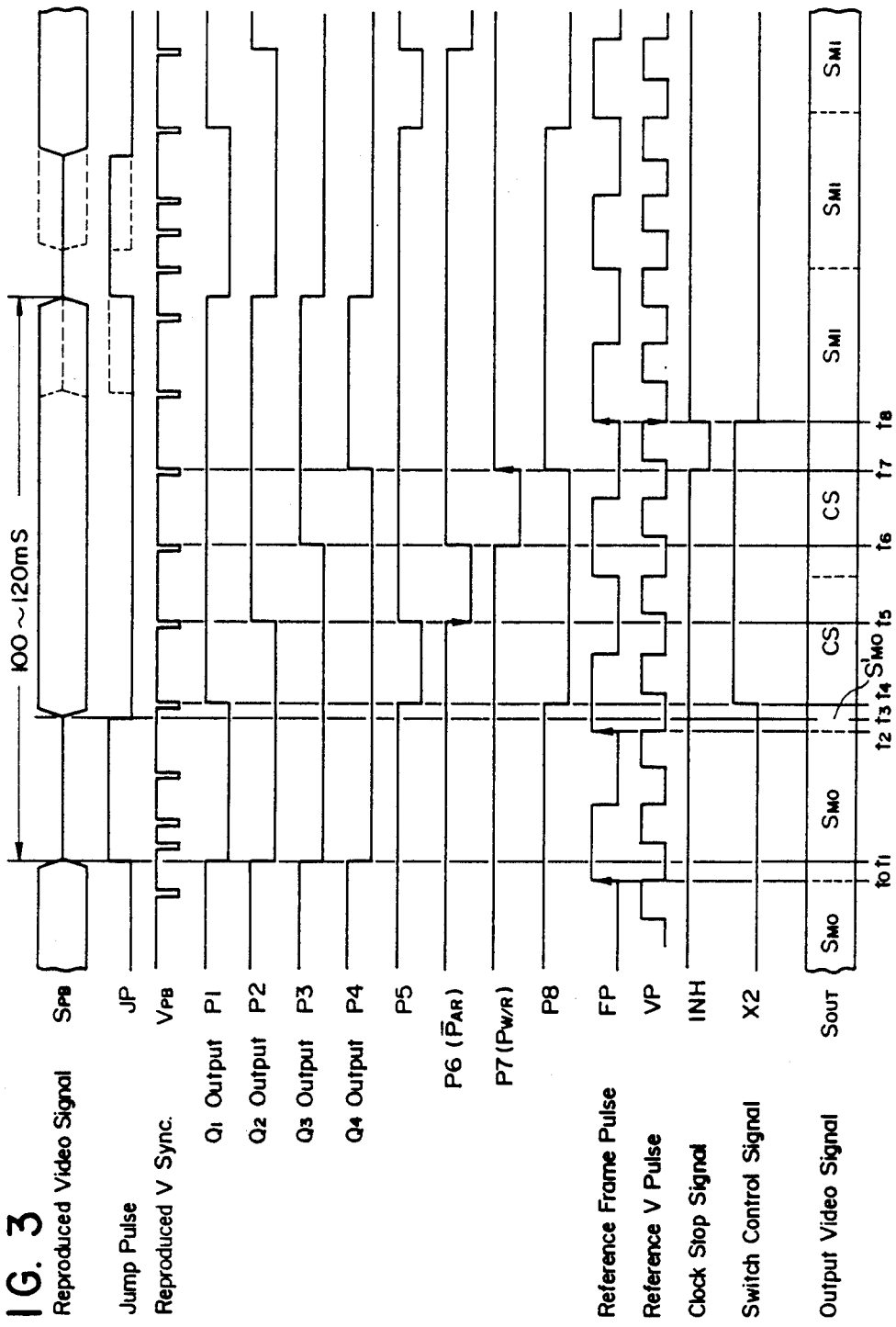
FIG. 3 is a timing chart of signals for explaining the operation of the exemplary embodiment.
Figure 4:
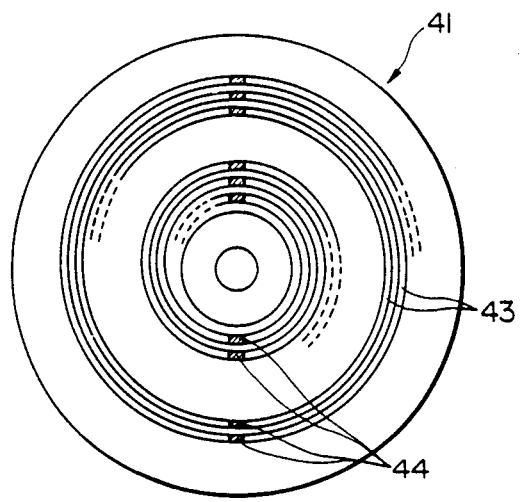
FIG. 4 is a schematic plan view of a standard CAV (constant angular velocity) disc.
Figure 5:
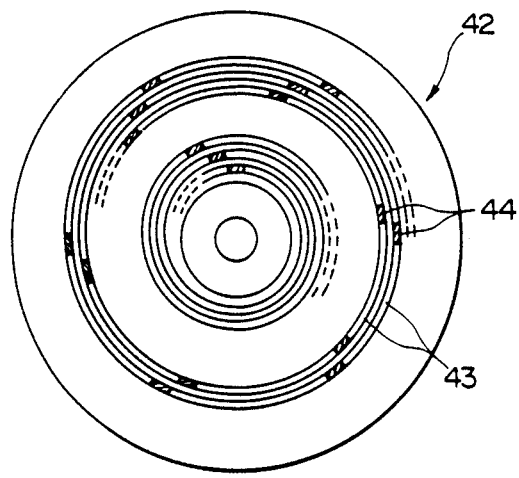
FIG. 5 is a schematic plan view of a long-time CLV (constant linear velocity) disc.

FIG. 2 shows detailed configurations of the sequence controller 30 and its peripheral circuits included in FIG. 1. FIG. 3 shows exemplary waveforms of signals produced during the operation in FIGS. 1 and 2.

The signal waveforms of FIG. 3 represent the operation performed in a varied-speed reproduction mode with track jumps, such as a fast-forward or reverse mode. In the above operation, track jumps are executed intermittently at a cycle of, e.g. 100 to 120 msec, and a relatively stable portion (e.g. one field) of the reproduced video signal is written in the field memory 3 during the time between the track jumps and then is read out therefrom repeatedly until the next signal portion is written after the succeeding track jump. The writing of such video signal in the field memory 3 needs to be executed in synchronism with the vertical synchronizing pulse $V_{PB}$ of the reproduced video signal $S_{PB}$, while the reading out of the written signal needs to be executed in synchronism with the reference vertical synchronizing pulse VP kept constant independently of any disorder caused in the vertical synchronization by the track jump. The sequence controller 30 and its peripheral circuits are employed for the purpose of achieving such signal writing synchronously with the reproduced V pulse $V_{PB}$ and such signal reading synchronously with the reference V pulse VP.

In FIG. 3, respective broken lines of the jump pulse JP and the reproduced video signal $S_{PB}$ represent a lower limit of the track jump cycle varied due to the difference between the types of the disc reproducing apparatus 1 or the like.

Hereinafter the operation will be described. The function mode decoder 29 shown in FIG. 2 is, for example, a 2-to-4 or 3-to-8 line decoder composed of a TTL IC. The signal SQ from the terminal 14 and the signal PBL from the terminal 15 are fed respectively to input terminals A and B of the decoder 29, so that outputs $FM_0$ through $FM_3$ are obtained therefrom correspondingly to the functions as listed in Table 1 below.

TABLE 1

|  | PBL | SQ | FUNCTION |
| --- | --- | --- | --- |
| $FM_0$ | 0 | 0 | Standard reproduction |
| $FM_1$ | 0 | 1 | Still motion |
| $FM_2$ | 1 | 0 | Varied-speed reproduction |
| $FM_3$ | 1 | 1 | Still motion |

The function relative to the output $FM_2$ in Table 1 corresponds to a varied-speed reproduction mode executed with track jumps such as the aforementioned fast-forward or reverse mode with the exception of a still motion mode. Inverted outputs (i.e. low active outputs) $\overline{FM_0}$–$\overline{FM_3}$ are obtained from the decoder 29. Of such outputs, $\overline{FM_0}$ and $\overline{FM_2}$ are fed respectively to negative input AND gates (functionally NOR gates) 9a and 9b of the analog switch control circuit 9. The output $\overline{FM_2}$ of the function mode detector 29 is inverted by means of an inverter to become $FM_2$, which is then fed to both a selective control terminal SL of a selector (changeover switch) 32 and an AND gate 33 partially constituting the sequence controller 30. The selector 32 is composed of a TTL IC which comprises at least three switches of two-inputs one-output type. In the varied-speed reproduction mode where the output $FM_2$ is "1" (of a high level "H"), B terminals are selected out of A and B inputs and are connected to respective Y output terminals individually.

In the varied-speed reproduction mode, jump pulses JP are fed to the terminal 13 at a repetition cycle of 100 to 120 msec or so as shown in FIG. 3, and the pickup head of the disc reproducing apparatus 1 performs a track jump in response to each of such jump pulses JP, whereby the reproduced video signal $S_{PB}$ is not obtained substantially during the jump time between t1 and t3. The jump pulse JP is fed to, e.g. a terminal D1 of a timing pulse generator 31 in the sequence controller 30 and also to the aforesaid AND gate 33. The timing pulse generator 31 is composed of a TTL IC or the like comprising at least four D-type flip-flops, wherein the output of the AND gate 33 is inverted and fed to a clear terminal CL while the reproduced V pulse $V_{PB}$ from the terminal 12 is fed to a clock terminal CK.

The four D-type flip-flops in the timing pulse generator 31 are in cascade connection, and the respective outputs of the flip-flops are such as denoted by P1 through P4 in FIG. 3. As shown, each of the timing pulses P1–P4 falls at the rise time t1 of the jump pulse JP, and the pulse P1 corresponding to the first Q1 output rises at the input time t4 of the first reproduced V pulse $V_{PB}$ immediately after the fall time t3 of the jump pulse JP. Subsequently, in a manner similar to the above, the pulses P2, P3 and P4 corresponding to the Q2, Q3 and Q4 outputs respectively rise at the input times t5, t6 and t7 of the succeeding reproduced V pulses $V_{PB}$.

The timing pulse generator 31 further generates $\overline{Q1}$–$\overline{Q4}$ outputs which are inversions of Q1–Q4. With regard to such outputs, Q1 and $\overline{Q2}$ are fed to a NAND gate 34a, Q2 and $\overline{Q3}$ outputs to a NAND gate 34b, and Q3 and $\overline{Q4}$ to a NAND gate 34c, respectively. Therefore the output pulses of the NAND gates 34a, 34b and 34c come to have waveforms of P5, P6 and P7 respectively as shown in FIG. 3. These pulses are synchronized with the reproduced V pulses $V_{PB}$ and become "0" signals (of a low level "L") only during one field of t4–t5, t5–t6 and t6–t7 respectively. Such pulse signals are formed so that the reproduced video signal $S_{PB}$ can be written in the field memory 3 synchronously with the reproduced V pulse $V_{PB}$ and also that relatively stable timing can be ensured for signal reproduction posterior to the track jump. For example, under the conditions that will be described later, the pulse P6 is used as an inverted pulse $\overline{P_{AR}}$ of the aforesaid address reset pulse $P_{AR}$, and the pulse P7 is used as the aforesaid write/read pulse $P_{W/R}$. These pulses P5, P6 and P7 are fed to a three negative input type NOR gate (functionally AND gate) 35, whereby a pulse P8 is formed as shown in FIG. 3. The pulse P8 thus obtained is then fed to a selective control terminal SL of a selector 36 for outputting the aforesaid address reset pulse $P_{AR}$ and also to a negative input NOR gate (AND gate) 37.

In the selector 36, the output pulse P6 from the NAND gate 34b is inverted and fed to a selection terminal A, and the frame pulse FP from the 1/525 frequency divider 26 is fed to a selection terminal B, respectively. The A input is selected when the pulse P8 serving as a switch control signal is "0" (of a low level "L"), while the B input is selected when the pulse P8 is "1", and the selected one is obtained from an output terminal Y. The output therefrom is used as the address reset pulse $P_{AR}$ for the field memory 3.

The reproduced V pulse $V_{PB}$ from the terminal 12 is fed to a clock input terminal CK of the ½ frequency divider 27 which is so formed as to feed the $\overline{Q}$ output of the D-type flip-flop back to the data input terminal D, whereby the pulse $V_{PB}$ is processed to be a reproduced frame pulse $F_{PB}$ and then is fed to a selection input terminal A3 of the selector 32. A voltage of +5 V equivalent to "1" (high level) is applied to the selection terminal B3 of the selector 32, and either of the A3 and B3 inputs is selectively taken out from the terminal Y3 and then is fed to a clear terminal CL of the 1/525 frequency divider 26. A third switch associated with the terminals A3, B3 and Y3 of the selector 32 corresponds to the switch 28 shown in FIG. 1. In the varied-speed reproduction mode, the B3 input "1" is always fed to the clear terminal CL of the 1/525 frequency divider 26; while in any other mode, the A3 input or the reproduced frame pulse $F_{PB}$ is fed to the clear terminal CL of the 1/525 frequency divider 26. It follows, therefore, that in any mode other than the varied-speed reproduction mode, reference V pulses VP and reference frame pulses FP synchronized with the reproduced frame pulses $F_{PB}$ are outputted from the 1/525 frequency divider 26; while in the varied-speed reproduction mode, frame pulses FP obtained by mechanical 1/525 frequency division of reference H pulses HP are outputted from the frequency divider 26.

In the varied-speed reproduction mode as shown in FIG. 3, reference frame pulses FP and V pulses VP, which are temporally continuous and free from any disorder that may be caused by track jump, are obtained independently of the reproduced V pulse $V_{PB}$. When the timing pulse P8 is "1", the reference frame pulse FP is fed as an address reset pulse $P_{AR}$ to the field memory 3 via the selector 36 and thereby resets the memory address to zero synchronously with each rise at time t0, t2 and so forth shown in FIG. 3. Consequently, the video signal $S_{MO}$ is read out from the field memory in synchronism with the reference frame pulse FP. The video signal $S_{MO}$ is obtained by repeatedly reading out the one-field video signal portion stored previously in the field memory 3 anterior to time t0, with the interlace of even and odd fields taken into consideration. In FIG. 3, each frame of such video signal is shown with division by broken lines.

The reference H pulse HP from the terminal 16 and the reference V pulse VP from the 1/525 frequency divider 26 are fed to the composite synchronizing signal generator 25, which then generates a composite synchronizing signal CS synchronously with the reference H pulse HP and V pulse VP. The signal CS thus produced is sent to the switch 6.

The analog switch control signal X2 is formed directly of the Y2 output obtained from the selector 32 and, in the varied-speed reproduction mode, the B2 input corresponding to the output of the gate 37 is selected. The output of the gate 37 is a logic product of the pulse P8 and the clock inhibit signal INH produced by the D-type flip-flop 38 and the NAND gate 39, so that the signal X2 has such a waveform as shown in FIG. 3. Another analog switch control signal X3 is outputted from the negative input AND gate 9b of the switch control circuit 9. Since the AND gate 9b is supplied with the aforesaid $\overline{FM2}$ and X2, the signal X3 becomes an inversion of the signal X2 in the varied-speed reproduction mode. When each of such signals X2 and X3 is "0", the switches 5 and 6 shown in FIG. 1 are turned on under control. Accordingly, at the rise time t4 of the signal X2, the switch 5 is turned off while the switch 6 is turned on so that the composite synchronizing signal CS produced by the generator 25 is obtained from the output terminal 8 during the period from t4 to t8. The signal CS is also synchronous with the reference frame pulse FP as mentioned previously.

In the period between t4 and t7 during which the pulse P8 is "0", the A input of the selector 36 is selected to become an address reset pulse $P_{AR}$, so that the address in the field memory 3 is reset at time t5, i.e. fall of the pulse P6 (rise of the inverted pulse), and an address counting action is performed in synchronism with the reproduced V pulse $V_{PB}$. In this stage the pulse P7 is taken out from the Y1 output via the B1 input of the selector 32 and then is fed as the aforesaid write/read switch signal $P_{W/R}$ to the field memory 3, which is thereby rendered ready for writing only during one field (between t6 and t7) in which the pulse P7 is "0". Accordingly, the reproduced video signal $S_{PB}$ of one field (between t6 and t7) is written in the field memory 3 in synchronism with the reproduced V pulse $V_{PB}$.

For the purpose of reading out the video signal from the field memory 3 in synchronism with the reference V pulse VP, generation of address-counting clock pulses is inhibited by the clock stop or inhibit signal INH only during the period between t7 and t8. The clock stop signal INH is produced by first feeding the pulse P7 to the data input terminal D of the D-type flip-flop 38 while inverting and feeding the reference V pulse VP from the 1/525 frequency divider 26 to the clock terminal CK, and then processing the $\overline{Q}$ output of the D-type flip-flop 38 and the pulse P7 by the NAND gate 39. The signal INH serves to stop the address counting action during the period from time t7, at which the counting has reached the final address in the field memory 3, to time t8 or fall of the next V pulse VP. And the address counting action is started from an initial value zero at time t8, so that the reading can be performed in synchronism with the reference V pulse VP. It is a matter of course that the video signal $S_{M1}$ read out in this stage is the reproduced one-field video signal written during the period between t6 and t7. Since the switch 5 is turned on while the switch 6 is turned off at time t8, the output video signal SOUT obtained from the output terminal 8 is the aforesaid read-out video signal $S_{M1}$.

Thus, the output video signal $S_{OUT}$ from the output terminal 8 is the video signal $S_{MO}$ until time t4, then becomes the composite synchronizing signal CS between times t4 and t8, and subsequently the video signal $S_{M1}$ after time t8. Each of such signals is synchronous with the reference V pulse VP and frame pulse FP, whereby no disorder is induced in the synchronism of the output video signal $S_{OUT}$ to eventually attain effective prevention of any disorder in the reproduced picture. During the period between t4 and t8, merely the synchronizing signal alone is outputted and the display screen is placed in a black state without any picture. However, such period is extremely short as two or three fields, so that there arises no problem visually for the user.

Meanwhile in the standard reproduction mode, differing from the operation performed in the variedspeed reproduction mode mentioned above, the terminal A of each switch in the selector 32 is selectively connected and the normal/still switch signal SQ is inputted to the terminals A1 and A2 of the switches, so that each of the write/read switch signal $P_{W/R}$ for the field memory 3 and the switch control signal X2 becomes equal to the aforesaid signal SQ. Since the reproduced frame pulse $F_{PB}$ fed to the terminal A3 of the selector 32 is also fed to the clear terminal CL of the 1/525 frequency divider 26, the reference V pulse VP and frame pulse FP are synchronized with the reproduced synchronizing signals (such as V pulse $V_{PB}$ and frame pulse $F_{PB}$). Accordingly, the frame pulse FP serving as an address reset pulse $P_{AR}$ for the field memory 3 is rendered synchronous with the reproduced frame pulse $F_{PB}$, so that when a switching action for the still motion mode is executed during the standard reproduction, the signal can be written in and read out from the field memory 3 without any disorder in the vertical or frame synchronization (while proper synchronism is maintained with respect to the reproduced synchronizing signal). In the standard reproduction mode where the output $\overline{FM_0}$ of the function mode decoder 29 is "0" to render operable the gate 9a of the analog switch control circuit 9, the switch control signals X1 and X2 become complementary in accordance with the normal/still switching action, so that the switches 4 and 5 can be selectively changed (with the switch 6 kept in its off-state). Accordingly, in the normal reproduction mode, the reproduced video signal $S_{PB}$ directly becomes the output video signal $S_{OUT}$; while in the still motion mode, the signal read out from the field memory 3 becomes the video signal SOUT. No disorder is induced in the synchronism at the time of switching such signals, hence ensuring satisfactory reproduction without any disorder in the picture.

It is to be understood that the present invention is not limited to the above-mentioned embodiment alone. For example, writing the reproduced video signal $S_{PB}$ in the field memory may be executed at a rate of one per two or more track jumps instead of once per one track jump in the foregoing embodiment. As for the timing to write the signal in the field memory, the reproduced video signal of the third or fourth field after a track jump is written in the aforementioned example, but any field may be selected on condition that the video signal of such field after a track jump is relatively stable. Furthermore, the video signal of one frame (or two frames) may be written and read out by the use of a frame memory. In addition, a time base corrector may be employed to attain more complete prevention of disorder in the reproduced picture.

As described hereinabove, in the varied-speed reproduction performed with track jumps according to the present invention, the reproduced video signal of a relatively stable one-field duration after a track jump is written in the field memory, and the written video signal is read out therefrom in synchronism with a reference vertical synchronizing signal (V pulse VP), so that the periodicity of the vertical synchronizing signal of the output video signal is maintained constant to eventually achieve effective prevention of disorder in the reproduced picture, whereby practical picture monitoring is rendered possible even in the varied-speed reproduction mode. Furthermore, during and about the signal writing time, the composite synchronizing signal synchronous with the reference vertical synchronizing signal is selectively outputted, so that the scanning signal in a CRT (cathode-ray tube) monitor unit and so forth is maintained in a stable state to further stabilize the reproduced picture displayed through switching. Besides the above, satisfactory still picture reproduction can be performed easily in the standard reproduction mode without causing any disorder in the picture.

What is claimed is:

1. An apparatus for reproducing a video signal from a disc-shaped recording medium having recording tracks on which a video signal is so recorded that the length in the track direction for a video signal of one field duration is constant regardless of the radius of the recording track, said apparatus comprising:

a reproducing head for reproducing the video signal including at least a vertical synchronizing signal;

means for generating a track jump signal supplied to said reproducing head;

memory means for storing at least one field of the video signal;

a vertical synchronizing signal separating circuit for separating the reproduced vertical synchronizing signal from said reproduced video signal;

a reference synchronizing signal generator for generating at least a reference vertical synchronizing signal; and memory control means supplied with said track jump signal, said reproduced vertical synchronizing signal and said reference vertical synchronizing signal for controlling said memory means so that a selected portion of said reproduced video signal of at least one field duration succeeding said track jump signal is written in said memory means in synchronism with said reproduced vertical synchronizing signal, and so that the selected portion of said reproduced video signal sotred in said memory means is read out therefrom as an output in synchronism with said reference vertical synchronizing signal.

2. A reproducing apparatus according to claim 1, wherein said reference synchronizing signal generator includes means for generating a composite synchronizing signal, and said memory control means includes selecting means for selecting one of at least the output of said memory means and said composite synchronizing signal as a video output signal.

3. A reproducing apparatus according to claim 2, wherein said memory control means includes function mode detecting means for detecting when said apparatus is in a reproducing mode, switch control signal generating means supplied with an output of said function mode detecting means for generating a switch control signal, said selecting means being controlled by said switch control signal for selecting one of said reproduced video signal, the output of said memory means and said composite synchronizing signal as said video output signal.

4. A reproducing apparatus according to claim 3, wherein said reference synchronizing signal generator includes a phase locked loop circuit supplied with a horizontal synchronizing signal of said reproduced video signal for generating a horizontal pulse, and a frequency divider supplied with said horizontal pulse for generating said reference vertical synchronizing signal.

5. A reproducing apparatus according to claim 1, wherein said memory means includes an address reset terminal and said memory control means includes address reset pulse generating means for generrting an address reset pulse supplied to said address reset terminal of said memory means, said address reset pulse being synchronized with said vertical synchronizing signal separated from said reproduced video signal.

6. A reproducing apparatus according to claim 1, wherein said memory means incudes a read/write switching terminal and said memory control means includes read/write switching signal generating means for generating a read/write switching signal supplied to said read/write switching terminal of said memory means, said read/write switching signal being synchronized with said vertical synchronizing signal separated from said reproduced video signal.

* * * * *